Jan. 27, 1959  A. G. GURRIES  2,870,747
HIGH TORQUE HYDRAULIC MOTOR
Filed Feb. 18, 1957  4 Sheets-Sheet 1

INVENTOR.
A. G. Gurries
BY
ATTYS

Jan. 27, 1959 — A. G. GURRIES — 2,870,747
HIGH TORQUE HYDRAULIC MOTOR
Filed Feb. 18, 1957 — 4 Sheets-Sheet 3

INVENTOR.
A. G. Gurries
BY
ATTYS

Jan. 27, 1959     A. G. GURRIES     2,870,747
HIGH TORQUE HYDRAULIC MOTOR
Filed Feb. 18, 1957     4 Sheets-Sheet 4
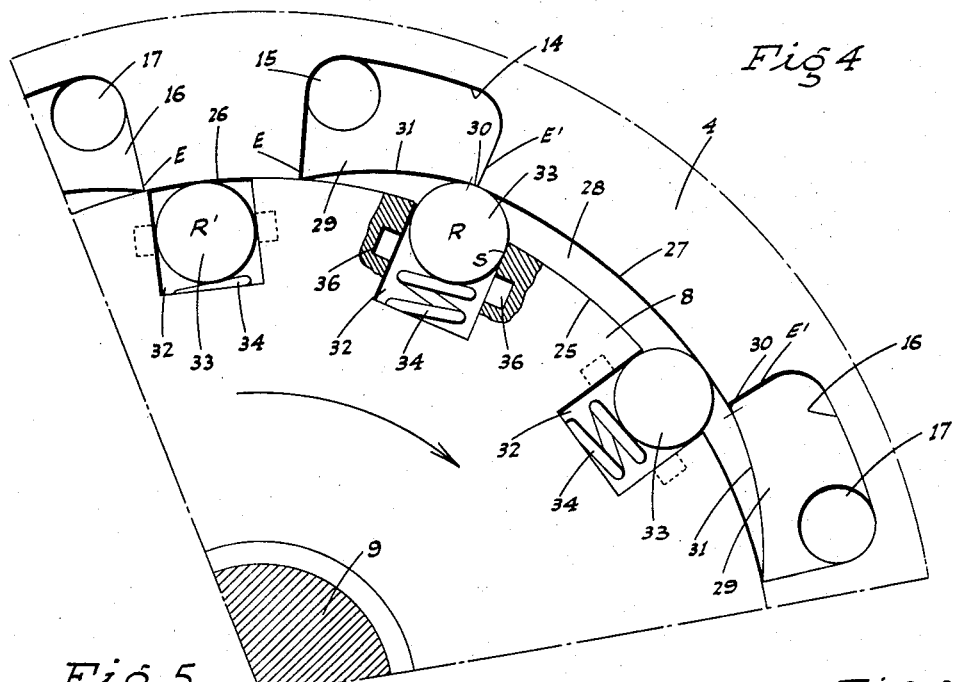
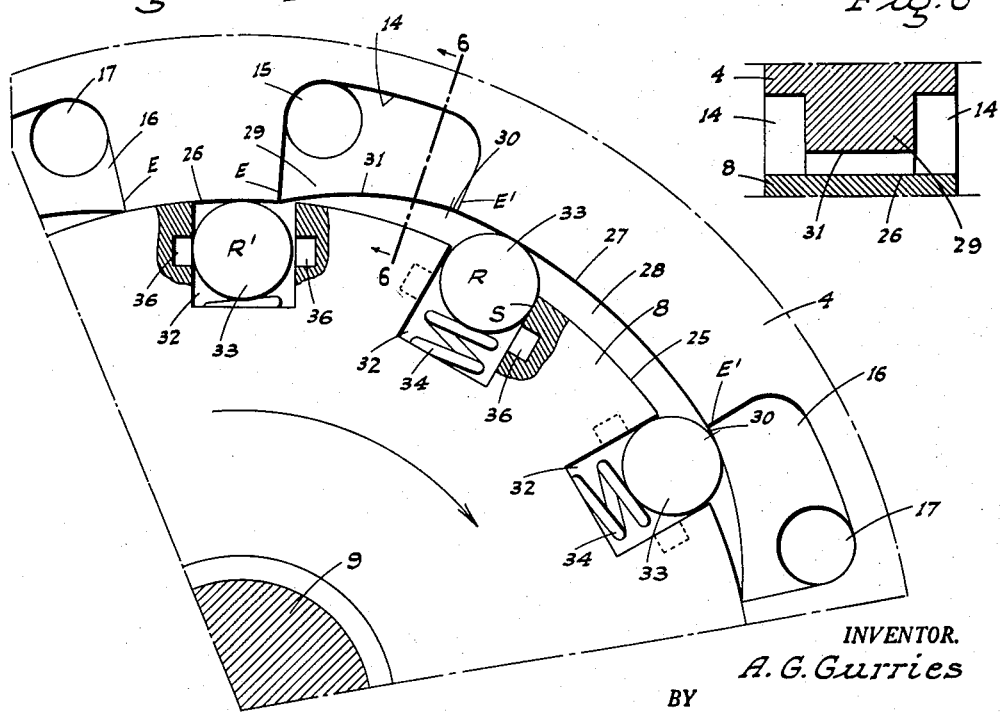
INVENTOR.
A. G. Gurries
BY
ATTYS United States Patent Office 2,870,747
Patented Jan. 27, 1959

2,870,747

HIGH TORQUE HYDRAULIC MOTOR

Albert G. Gurries, Gilroy, Calif.

Application February 18, 1957, Serial No. 640,763

2 Claims. (Cl. 121—86)

This invention relates in general to hydraulic motors of the rotor type.

In particular, the invention is directed to—and it is a major object to provide—a motor of this general type having a plurality of power or impulse stations positioned in evenly spaced relation about the rotor so that the latter is hydraulically balanced radially; there being an arrangement which assures of constant fluid flow to and from the rotor and constant output torque.

Another important object of the invention is to provide a hydraulic motor having power or impulse vanes in the rotor which are in the form of rollers so that friction and wear are minimized.

An additional object of the invention is to mount the rollers in the rotor so that they will remain hydraulically balanced where necessary, and a reverse thrust cannot be imparted to any roller before the latter becomes fully exposed to the fluid in any power chamber.

A further object of the invention is to construct the motor so that the rollers will travel on a constant radius when on the power stroke, so as to impart a constant torque to the rotor, and which motor is ported so that the rollers are in low pressure fluid when they are moving along a path having a changing radius.

A still further object of the invention is to construct the motor so that it can be reversed, without loss of speed or efficiency, merely by reversing the direction of flow of the fluid through the motor from exteriorly of the same.

The motor includes a plurality of power chambers about the rotor for the fluid to be fed to the rollers, and a similar number of fluid relief chambers; and another object of the invention is to provide manifolds within the body for the power fluid and the return fluid, and to provide passages leading from the manifolds to the various chambers, arranged so as to minimize the number of sharp turns in the flow passages between the manifolds and chambers, and to thus reduce friction and the tendency to overheat.

It is also an object of the invention to produce a practical, reliable, and durable high torque hydraulic motor, and one which will be exceedingly effective for the purpose for which it is designed.

These objects are accomplished by means of such structure and relative arrangement of parts as will fully appear by a perusal of the following specification and claims.

In the drawings:

Fig. 4 is an enlarged fragmentary cross section, also taken on line 2—2 of Fig. 1, showing the roller-type power vanes in a certain position relative to a pressure chamber and the adjacent relief chamber, in the direction of rotation of the rotor.

Fig. 5 is a similar view, but showing another position of the power vanes relative to said pressure and relief chambers.

Fig. 6 is a cross section, on a reduced scale, on line 6—6 of Fig. 5.

Figure 1:
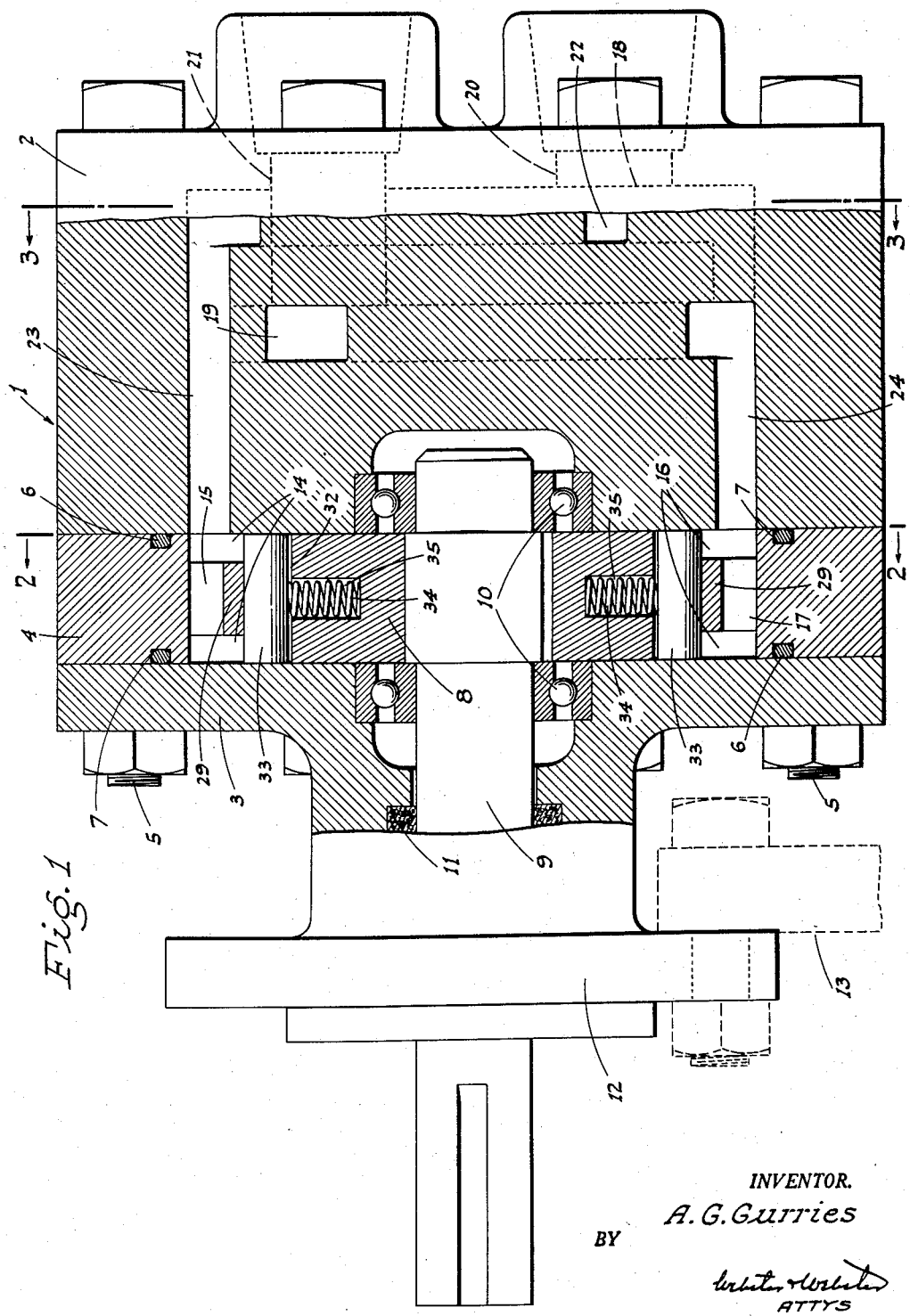
Fig. 1 is a side elevation of my improved hydraulic motor, mainly in section.
Figure 2:
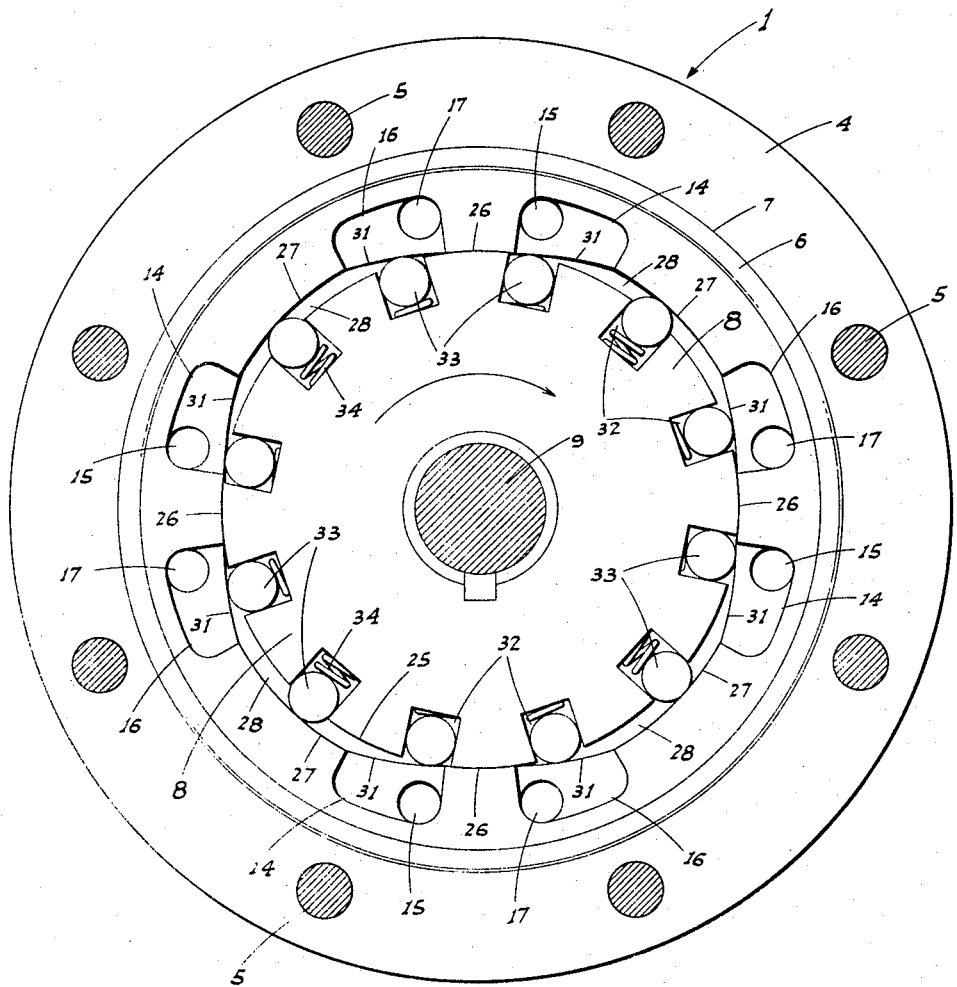
Fig. 2 is a cross section on line 2—2 of Fig. 1.
Figure 3:
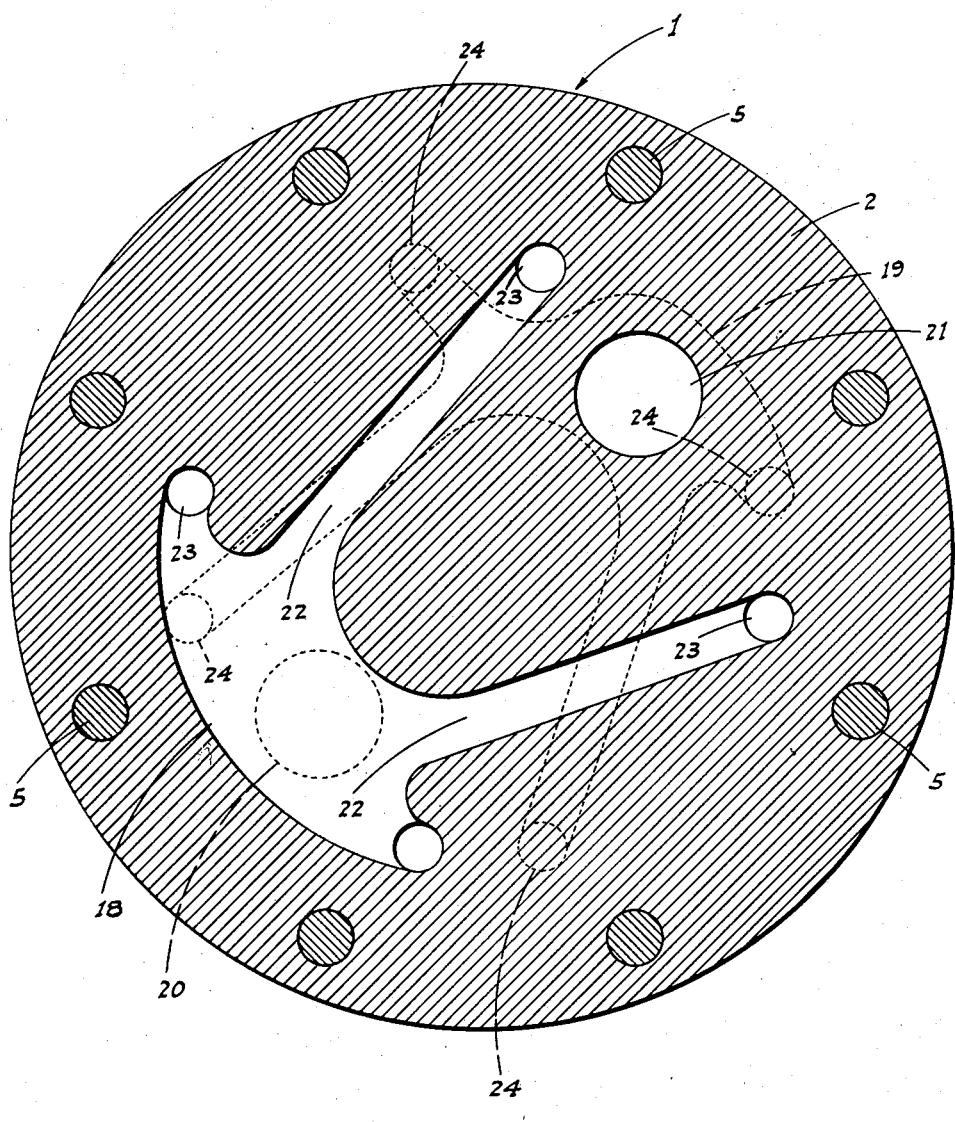
Fig. 3 is a similar view on line 3—3 of Fig. 1.

Referring now more particularly to the drawings, and to the characters of reference marked thereon, the motor comprises a body, indicated generally at 1 and preferably of circular form. The body 1 comprises a rear end section 2, a forward end section 3, and an intermediate ring-like section 4. The three sections are detachably clamped together by longitudinally extending bolts 5; ring section 4 being sealed against the adjacent surfaces of sections 2 and 3 by annular sealing rings 6 seated in grooves 7 in section 4.

A rotor 8 is disposed in the body radially inward of section 4 between and in close running relation to the adjacent faces of sections 2 and 3. This rotor is fixed on a shaft 9 journaled in antifriction bearings 10 in body sections 2 and 3 and projecting through and beyond section 3 for connection to the member to be driven.

A packing gland 11 surrounds the shaft between the outer end of body section 3 and the adjacent bearing 10. Said body section 3, at its outer end, includes a heavy flange 12 adapted for connection to a mounting member, as indicated at 13, so that the body 1 may be supported in a fixed position and held against rotation.

Formed in the side faces of the ring section 4 of the body 1, and extending to the inner periphery thereof, are pressure or power chambers 14, arranged as opposed pairs of the same size and relative position, and connected by a passage 15 in the body section 4, as clearly shown in Fig. 1.

In the motor as here shown there are four pairs of such chambers, spaced evenly or 90 degrees apart about the section, but a different number of such pairs may be used if desired, as long as the chambers are evenly spaced.

Also formed in the body section 4 and extending to the inner periphery thereof are relief chambers 16, of the same number, size, and circumferential spacing as the chambers 14; each pair of such chambers being connected by a passage 17 within section 4. The various chambers 14 and 16 are not however evenly spaced relative to each other; the spacing of the chambers 16 from the chambers 14 in the direction of rotation of the rotor being approximately twice as great as the spacing of said chambers 14 from chambers 16 in the opposite direction. The initially open sides of all the chambers are closed by the adjacent end walls of body sections 2 and 3.

In order to feed fluid to all the chambers 14 simultaneously, and to release or withdraw fluid from chambers 16, the following arrangement is provided:

Formed in the body section 2 are longitudinally spaced pressure and relief manifolds 18 and 19, respectively; intake and outlet or discharge passages 20 and 21, respectively, leading to manifolds 18 and 19 through the body from the rear end thereof.

Other relatively small passages 22, which include longitudinally or axially extending portions 23, lead from the manifold 18 to the various adjacent ones of the pressure chambers 14, while similar passages 24 lead from the manifold 19 to the various adjacent ones of the relief chambers 16. The manifolds—together with the various passages—are so arranged in the body and relative to the pressure and relief chambers that sharp turns in the line of flow of the fluid in either direction are reduced to a minimum; thus reducing friction losses and preventing possible overheating of the fluid.

Also, the size of both manifolds is substantially the same, and the cross-sectional areas of the intake and outlet passages 20 and 21 are the same. This is true also of the various internal passages 22 and 24. By reason of this feature, fluid may be fed into either manifold and withdrawn from the other one and so as to reverse the direction of rotation of the rotor, without loss of power or reduction of speed of the rotor.

The circumferential periphery 25 of rotor 8 is concentric throughout its extent with the axial shaft 9. The bore of the ring section 4 is the same diameter as the rotor, only for those portions of said bore which extend between the adjacent end walls E of those ones of the chambers 14 and 16 which are closest to each other in their spacing about section 4, as shown at 26.

The bore portions 27 of ring section 4 between the opposite end walls $E^1$ of said closest chambers, and which are the adjacent end walls of the relatively widely spaced chambers 14 and 16, are however materially greater than bore portions 26, and of the periphery of the rotor, so as to leave circumferentially extending passages 28 therebetween. These passages are of course in free communication at their ends with the corresponding chambers 14 and 16; the side walls of said passages being the adjacent walls of body sections 2 and 3.

The bore portions 27 are concentric with the rotor and extend a short distance into chambers 14 and 16 along the webs 29 which separate the pairs of chambers 14 and 16 transversely of the rotor, as shown at 30 in Figs. 4 and 5. The bore surfaces 26 and 27 are connected by relatively sloping—and preferably gently curved—bore surfaces 31 extending along said webs 29.

The rotor 8 is formed with a plurality of evenly spaced, full-width rectangular pockets 32 extending radially inward from the periphery of the rotor. The width of each pocket circumferentially of the rotor is less than the circumferential extent of any bore portion 26, while the spacing of the pockets is such that when any one pocket is positioned centrally of any bore portion 26, the adjacent pocket is centered beyond the adjacent chamber 14 or 16, while the pocket beyond said adjacent pocket is centered adjacent but still back of the next chamber 14 or 16 in the direction of rotation of the rotor.

Rotatably and radially movably mounted in each pocket 32 is a roller 33, whose axis is parallel to the axis of the rotor and whose length is the same as the width of said rotor. The depth of the pockets is slightly greater than the diameter of the rollers, and such diameter is slightly less than the width of the pockets, as shown in Figs. 4 and 5. Each roller is yieldably held against the cam track formed by the successive bore portions 26, 27, and 31 of the body section 4 by a compression spring 34 mainly retained in a radial well 35 in the rotor centrally of the ends and width of each pocket 32.

Cut in the side walls of each pocket intermediate their ends are transverse bleed grooves or bypasses 36, positioned so as to allow of a relatively unrestricted flow of fluid between the roller and the opposite sides of the corresponding pocket when said roller is fully depressed in the pocket and is engaged with the portions 26 of the cam track.

The total number of pockets and rollers is an even multiple of the number of chambers 14, so that if any one roller occupies a certain position relative to one chamber, other ones of the rollers will occupy corresponding positions relative to the other chambers 14.

In operation, fluid is maintained in manifold 18, and the various pressure chambers 14, at whatever pressure is necessary to feed any measured or desired volume of fluid through the motor in a given time. Assume that the rotor has stopped with certain ones of the rollers (which are in effect vanes) disposed so that each such roller—particularly here identified as R—is in contact with the track portion 27 at its junction with the end wall $E^1$ of the adjacent chamber 14, as shown in Fig. 4.

The fluid being continually forced into said chamber then acts on—and presses against—said roller to advance the same along the track surface 27. At the same time, the pressure fluid forces the roller against the far side of the corresponding pocket 32 to form a seal therewith, as at S. The fluid also gets into the pocket through the space between the roller and the near side of the pocket, so that the pressure aids the spring 34 in holding the roller in sealing contact with the track 27.

At this time, the fluid in passage 28 between the above mentioned roller and the one ahead is no longer under pressure, but is inert, and is merely being advanced toward the relief chamber 16 ahead. No pressure in a reverse direction is being applied against the roller $R^1$ behind said roller R; because of the seal then formed between the peripheral surface 25 of the rotor and the adjacent track surface 26, as shown in Fig. 4. As roller R is pushed ahead, turning the rotor, the roller ahead passes beyond the end wall $E^1$ of the adjacent relief chamber 16, as shown in Fig. 5, and the fluid in passage 28 between these two rollers is free to enter said relief chamber, and to flow thence through the corresponding passage and into manifold 19.

At the same time, the pocket of the roller $R^1$ behind roller R is gradually opening into chamber 14, as shown in Fig. 5, while said roller $R^1$ is still in contact with the adjacent track surface 26, and the periphery 25 of the rotor behind said pocket remains in sealing engagement with said track surface.

The pressure fluid in chamber 14 can then enter said pocket, and—by reason of the bypasses 36—flow around the roller $R^1$ and balance the pressure on both sides of the same. No reverse thrust is therefore applied to the roller $R^1$.

The pressure chambers 14, being of equal size and located on opposite sides of the track forming web 29, assures that the rollers moving past or exposed to the fluid in said chambers will remain hydraulically balanced.

It will be noted that fluid confined between roller R and the roller ahead, in the passage 28, is forced ahead and into chamber 16 by said roller R as the latter moves along track surface 27. If the flow from the return manifold or conduit system is restricted and a back pressure on the discharging or return fluid is set up, so as to slow down the rotor, no varying load will be placed on the shaft by such restriction, since the passage 28 is the same size throughout, and a constant torque action is therefore maintained.

While I have above described the roller and fluid action obtained in connection with an adjacent pair of chambers 14 and 16, it will be evident that the same action is simultaneously obtained at all the other pairs of chambers 14 and 16.

The various chambers 14 and 16 are all the same size, and the roller engaging track portions 31 at the ends of each passage 28 are identical. Either set of chambers 14 or 16 may therefore be used as the pressure or relief chambers, and the rotor may therefore be easily reversed in its direction of travel by feeding the driving fluid into manifold 19 rather than manifold 18. The power imparting "vanes," being turnable rollers, wear both of the track surfaces and wear of the rollers themselves is minimized.

Should undue wear develop between the contacting end faces of the rotor and the adjacent surfaces of body sections 2 and 3, it is only necessary to remove the bolts 5 so as to separate the various body sections from each other and from the rotor. This enables the end walls of the parts to be faced or reground to restore the desired close running-fit relation thereof. Other than this, no servicing or repair of the motor is ever necessary.

It should be noted that although the motor of this application has been described as being hydraulic, it may be operated by compressed air as well as by a liquid.

From the foregoing description it will be readily seen that there has been produced such a device as will substantially fulfill the objects of the invention as set forth herein.

While this specification sets forth in detail the present and preferred construction of the device, still in practice such deviations from such detail may be resorted to as do not form a departure from the spirit of the invention, as defined by the appended claims.

Having thus described the invention, the following is claimed as new and useful, and upon which Letters Patent are desired:

1. A fluid motor comprising a body, a rotor turnable in the body and having a peripheral surface concentric with the axis of the rotor, a shaft having an exposed end journaled in the body and fixed with the rotor, circumferentially spaced vanes mounted in the rotor for yieldable radial movement, a track in the body about the rotor and engaged by the vanes, said track being formed at evenly spaced intervals with portions closely engaging the periphery of the rotor and with other longer portions intermediate and of a greater radius than said first portions and with the body and the periphery of the rotor providing enclosed arcuate passages, the spacing of adjacent vanes being less than the arcuate extent of each such passage, means to simultaneously feed fluid into all the passages at one end thereof, and means to relieve fluid from the passages at the other end thereof; the vanes comprising transversely extending rollers, the rotor having pockets in which the rollers are seated and sufficiently deep to receive the rollers for their full diameter, each roller having clearance with the circumferentially spaced walls of the corresponding pocket, and said walls having bypass grooves, shorter than the axial extent of the roller, disposed at the level of the central plane of the roller when the latter is engaged with one of the first named track portions.

2. A fluid motor comprising a body, a rotor turntable in the body and having a peripheral surface concentric with the axis of the rotor, a shaft having an exposed end journaled in the body and fixed with the rotor, circumferentially spaced vanes mounted in the rotor for yieldable radial movement, a track in the body about the rotor and engaged by the vanes, said track being formed at intervals with portions closely engaging the periphery of the rotor and with other portions intermediate and of a greater radius than said first portions and with the body and the periphery of the rotor providing enclosed arcuate passages, means to simultaneously feed fluid into all the passages at one end thereof, and means to relieve fluid from the passages at the other end thereof; the vanes comprising transversely extending rollers, the rotor having pockets in which the rollers are seated and sufficiently deep to receive the rollers for their full diameter, each roller having clearance with the side walls of the corresponding pocket and one of said walls having an indentation of material depth and forming a fluid bypass; said indentation being shorter than the axial extent of the roller and being disposed at the level of the central plane of the roller when the latter is engaged with one of the first named track portions.

References Cited in the file of this patent

UNITED STATES PATENTS

| | | |
|---|---|---|
| 154,100 | Stott et al. | Aug. 11, 1874 |
| 392,356 | Minier | Nov. 6, 1888 |
| 476,868 | Brintnell | June 14, 1892 |
| 733,773 | Vogan et al. | July 14, 1903 |
| 747,418 | D'Halewyn | Dec. 22, 1903 |
| 810,601 | Augustine | Jan. 23, 1906 |
| 995,117 | Coleman | June 13, 1911 |
| 2,641,195 | Ferris | June 9, 1953 |
| 2,673,448 | Wheeler | Mar. 30, 1954 |

FOREIGN PATENTS

| | | |
|---|---|---|
| 222,022 | Switzerland | Dec. 16, 1942 |